UNITED STATES PATENT OFFICE 2,004,372

SOLDER FOR ALUMINIUM AND ITS ALLOYS

Alexander Luschenowsky, Berlin, Germany, assignor to Küppers Metallwerke G. m. b. H., Bonn-on-the-Rhine, Germany, a company of Germany No Drawing. Application March 31, 1934, Serial No. 718,511. In Germany March 31, 1931

1 Claim. (Cl. 75—1)

This invention refers to a solder especially for aluminium and its alloys and to a method of manufacturing the same.

The soldering of metals with the solders heretofore known requires the use of so-called fluxes or soldering agents, which serve as a preventative of oxidation or for removing the latter. Frequently, however, when using solders of low melting point it is undesirable to employ fluxes. The soldering of aluminium at a low temperature is very convenient for many purposes, but as is well known considerable difficulties arise. It was difficult to produce a satisfactory adhesion of the solder hitherto employed to the aluminium since the skin of oxide coating prevented a diffusion, and since the oxide had to be mechanically removed by scraping with a tool.

The present invention removes the difficulties hitherto arising in the soldering of aluminium and its alloys and ensures a reliable joint of high tensile strength and sufficient resistance to corrosion. The novelty consists in this that the solder comprises a basic alloy preferably of zinc and tin in which are distributed crystals of a harder alloy and of a higher melting point, preferably of zinc, tin and copper or zinc, tin copper and nickel, said crystals remaining solid within the fused basic alloy during the soldering process.

The solder described can be made by the following process, which likewise forms the subject of the invention:

First a liquid melt consisting preferably of eutectic of zinc and tin is made. A second alloy, which f. i. on account of its contents of copper or of copper and nickel besides tin and zinc is harder and has a higher melting point is brought into a molten state and is overheated. This second alloy is then mechanically introduced or incorporated in the molten first alloy in such a way, that small particles are formed, which upon being intensely cooled down within the comparatively cold melt of the basic alloy solidify to small crystals.

The introduction of the liquid second alloy into the basic alloy may be effected by pouring the overheated alloy into the fused basic alloy or by rubbing the hard alloy through a sieve and letting the liquid particles drop into the basic alloy, which is stirred, or by blowing the hard alloy by means of an inert gas into the fused basic alloy.

The specific gravity of both alloys is chosen in such a way, that the small particles remain equally suspended in the melt of the basic alloy, and do not collect or sink to the bottom.

The basic alloy preferably consists of 80–95% Sn and 20–5% Zn but preferably of an eutecticum of about 90% Sn and about 10% Zn, although of course other proportions may be used, as long as the melting point remains sufficiently low. To raise the melting point and to provide a harder alloy preferably copper is added and it may consists for example of 50–70 Sn, 40–20 Zn, 5–10 Cu. In order to raise the melting point and to diminish its solubility in the eutectic basic alloy the copper may be partly f. i. up to 50% replaced by nickel. But also other metals may be taken, which are suitable to produce an alloy, which has a higher melting point than the basic alloy, does not dissolve too easily in the latter, is harder and has about the same spec. weight. The hard alloy is added within limits of 5–50% of the basic alloy.

Preferably, first of all a small quantity of the second alloy is introduced into the liquid basic alloy. It may then be seen if an equal suspension of the formed crystals prevails. Should the introduced particles of the second alloy sink to the bottom, zinc for example is added to it; if it floats on the surface in view of its too small specific gravity the percentage of copper may be raised.

The atomization may be carried out by means of a sieve, or the liquid jet of superheated alloy being added is broken up in the known manner before entering into the liquid basic alloy. In this way mechanically introduced harder, higher melting crystals consisting of Zn and Cu persist in the eutectic basic alloy. A small part of the zinc of the additional alloy is dissolved in the eutectic basic alloy so that the latter, after setting, contains an excess phase of zinc.

The advantages of the solders described lie in the manner in which they act. During the soldering operation the softer basic alloy melts, whilst the hard crystals, fusible only at a higher temperature, remain as such, and mechanically scrape away the oxidic skin covering the aluminium when the solder is rubbed on the places to be joined. In this way the soldering can be carried out very rapidly and with certainty, the union always being secured over the whole of the surface being soldered together. The soldered joints of aluminium made with the solder described have a tensile strength which corresponds at least to that of the aluminium sheet usual in commerce.

The solders described, consisting chiefly of tin and zinc also possess a sufficient corrosion stability so that, for example, only a surface oxidation, and no perceptible decomposition, occurs when the soldered joint is exposed for a period of one month to the action of a salt water spray.

Further, owing to the fact that one of the constituents does not melt during the soldering operation, the solders provided by the invention possess an outstanding moulding capability and adhere in a thickly liquid state.

What I claim is:—

A method of manufacturing a solder for aluminium and its alloys, comprising melting a hard alloy containing from 50% to 70% tin, from 45% to 20% zinc and from 5% to 10% copper, melting a comparatively softer basic alloy containing from 80% to 95% tin and from 20% to 5% zinc, said alloys having substantially the same specific weight, due to the selection of the amounts of the components thereof, superheating the first-mentioned molten alloy, introducing the same in the superheated finely divided molten state into the second molten alloy and mechanically distributing the first-mentioned alloy in the second-mentioned alloy, whereby the first-mentioned alloy forms very fine crystals which remain solid during soldering.

ALEXANDER LUSCHENOWSKY.